(Model.)

H. PURRIER.
HAY PRESS.

No. 263,956. Patented Sept. 5, 1882.

WITNESSES:
Fred. G. Dieterich
Charles H. Bake

Henry Purrier
INVENTOR.
by Louis Bagger & Co.
ATTORNEYS.

UNITED STATES PATENT OFFICE.

HENRY PURRIER, OF GUNNISON, COLORADO.

HAY-PRESS.

SPECIFICATION forming part of Letters Patent No. 263,956, dated September 5, 1882.

Application filed July 18, 1882. (Model.)

*To all whom it may concern:*

Be it known that I, HENRY PURRIER, of Gunnison, in the county of Gunnison and State of Colorado, have invented certain new and useful Improvements in Hay-Presses; and I do hereby declare that the following is a full, clear, and exact description of the invention, which will enable others skilled in the art to which it appertains to make and use the same, reference being had to the accompanying drawings, which form a part of this specification, and in which—

Figure 1:
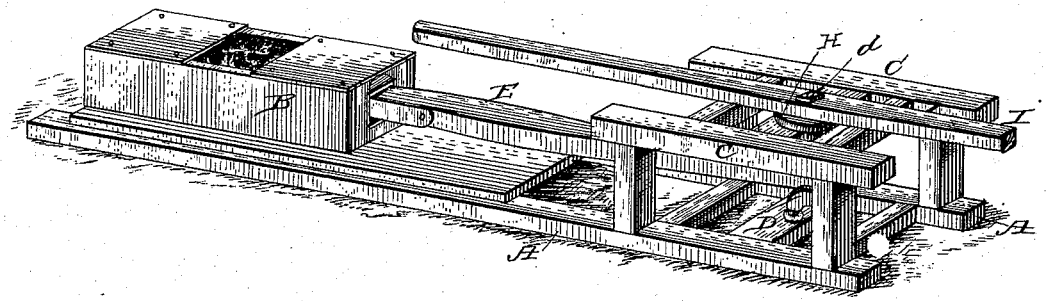
Figure 2:
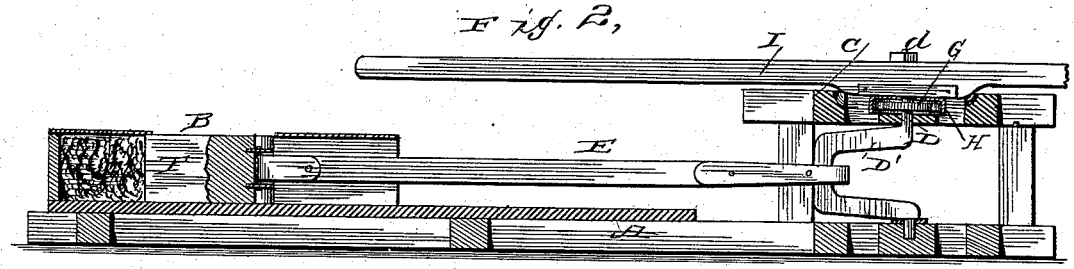
Figure 3:
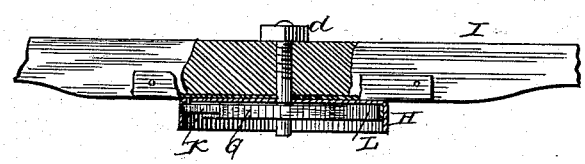
Figure 4:
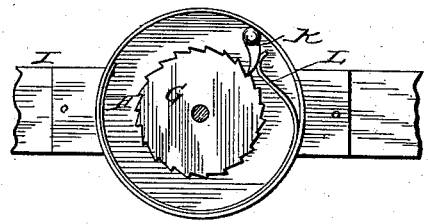

Figure 1 is a perspective view of my improved hay-press. Fig. 2 is a longitudinal vertical section of the same, and Figs. 3 and 4 are detail views of the pawl-and-ratchet device for operating the rebounding plunger.

Similar letters of reference indicate corresponding parts in all the figures.

My invention has relation to horizontal baling-presses operated by horse-power for baling hay and feed; and it consists in the combination, with the press-box, of a rebounding plunger which is actuated by a pawl-and-ratchet device attached to the center of the sweep or sweeps, substantially as hereinafter more fully described and claimed.

In the accompanying drawings, the letters A A are the ground-sills, and B the press-box, which may be of any desired size and construction.

C is a frame mounted upon the opposite end of the sills A A, and forming a bearing for the vertical crank-shaft D, the crank D' of which is connected to the outer end of the pitman E, at the inner end of which is the plunger F, working in the press-box.

Upon the upper end of shaft D is keyed or otherwise secured a ratchet-wheel, G. This is covered by a circular flanged box, H, to the top of which the sweeps I are fastened. The top of the crank-shaft D projects up through a central aperture in cap H and through the middle of the sweeps or levers I, to which it is nutted at *d*.

Inside of cap H is pivoted a pawl, K, actuated by a spring, L, as will be seen more clearly in Fig. 4 of the drawings, which represents an inverted view of the cap with its pawl and spring. When the cap is in its proper position upon the shaft D its spring-pawl K will engage the teeth of the ratchet-wheel G, and as the cap is rotated by the sweeps and the horses hitched to them it follows that crank-shaft D will be rotated also, thus working pitman E and its plunger F in the press-box, so as to compress the contents thereof. When the plunger has reached the end of its stroke—that is, when crank D' is in a line with pitman E, as represented in Fig. 2 of the drawings—the next turn of the sweeps will cause the crank to pass the line, and the expansion of the bale reacting on the plunger will rebound pitman E and cause ratchet G to slip the pawl. In this manner the plunger is thrown to the end of its upstroke in a moment of time, instead of being drawn there by the revolution of the crank and sweeps, as on the downstroke, and it follows that the compressed bale may be removed and fresh hay filled into the press-box to the full capacity of the latter in the very moment when the finished bale has been compressed. The compression of a fresh bale will commence the moment pawl K again engages the ratchet-wheel, which of course is at a point diametrically opposite to that at which it slipped, or, in other words, at the end of the upstroke of the pitman and plunger.

The expansion of the compressed bale necessary to effect the rebounding of the plunger need not be greater than that which ensues after cording or tying the bale; but, if desired, a spring may be so arranged as to operate in conjunction with the pitman to effect its rebounding at the point when the downstroke of the plunger has been reached.

Having thus described my invention, I claim and desire to secure by Letters Patent of the United States—

In a baling-press, the combination of the press-box B, rebounding plunger F, having pitman E, shaft D, having crank D' and ratchet-wheel G, and flanged cap H, having the spring-pawl K, and provided with the sweeps I, the whole constructed and arranged to operate substantially in the manner and for the purpose herein shown and set forth.

In testimony that I claim the foregoing as my own I have hereunto affixed my signature in presence of two witnesses.

HENRY PURRIER.

Witnesses:
AARON HEIMS,
I. J. HARTMAN.